United States Patent
Maucher et al.

(10) Patent No.: US 9,566,866 B2
(45) Date of Patent: Feb. 14, 2017

(54) CONTROL DEVICE FOR A REGENERATIVE BRAKING SYSTEM OF A VEHICLE, AND METHOD FOR OPERATING A REGENERATIVE BRAKING SYSTEM OF A VEHICLE

(71) Applicant: Robert Bosch GmbH, Stuttgart (DE)

(72) Inventors: Thorsten Maucher, Heidelberg (DE); Jochen Bodmann, Oberstenfeld (DE); Gottfried Bauer, Stuttgart (DE); Stefan Strengert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/423,003

(22) PCT Filed: Jul. 9, 2013

(86) PCT No.: PCT/EP2013/064427
§ 371 (c)(1),
(2) Date: Feb. 20, 2015

(87) PCT Pub. No.: WO2014/029548
PCT Pub. Date: Feb. 27, 2014

(65) Prior Publication Data
US 2015/0239350 A1    Aug. 27, 2015

(30) Foreign Application Priority Data
Aug. 23, 2012    (DE) .................... 10 2012 214 985

(51) Int. Cl.
*B60L 7/18*    (2006.01)
*B60T 1/10*    (2006.01)
(Continued)

(52) U.S. Cl.
CPC .. *B60L 7/18* (2013.01); *B60T 1/10* (2013.01); *B60W 10/06* (2013.01); *B60W 10/08* (2013.01);
(Continued)

(58) Field of Classification Search
CPC .......... B60L 7/18; B60L 7/26; B60L 11/1872; B60L 3/0076; B60T 2270/604; B60W 10/08; B60W 2510/083; B60W 2510/18; B60W 2710/0666; B60W 30/18127
(Continued)

(56) References Cited

U.S. PATENT DOCUMENTS 5,967,621 A    10/1999    Ito et al.
2006/0064225 A1*    3/2006    Tabata .................... B60K 6/48
                                                                            701/96
(Continued)

FOREIGN PATENT DOCUMENTS

DE    10 2005 059373    6/2006
DE    10 2007 000195    10/2007
(Continued)

*Primary Examiner* — Dalena Tran
(74) *Attorney, Agent, or Firm* — Norton Rose Fulbright US LLP; Gerard Messina

(57) ABSTRACT

A control device for a vehicle regenerative braking system, having an engine control device, with which a setpoint engine braking torque variable for a setpoint engine braking torque to be imparted by an electric motor, useable in generator mode, is defineable, considering a setpoint overall braking torque variable for a predefined setpoint overall braking torque, and considering an actual friction braking torque variable for an imparted/impartable actual friction braking torque of at least one additional friction brake, wherein if the setpoint variable is below a threshold, the setpoint variable is defineable according to a difference between the setpoint overall braking torque to be imparted and the imparted/impartable braking torque, and if the
(Continued)

setpoint variable is above the threshold, the setpoint variable is defineable according to a sum of a predefined additional braking torque and the difference. Also described are a regenerative braking system and method.

15 Claims, 3 Drawing Sheets

(51) Int. Cl.
    B60W 10/06     (2006.01)
    B60W 10/08     (2006.01)
    B60W 10/184    (2012.01)
    B60W 30/18     (2012.01)
    B60W 10/188    (2012.01)
    F16D 61/00     (2006.01)

(52) U.S. Cl.
    CPC .......... *B60W 10/184* (2013.01); *B60W 10/188* (2013.01); *B60W 30/18127* (2013.01); *F16D 61/00* (2013.01); *B60T 2270/604* (2013.01); *B60W 2510/083* (2013.01); *B60W 2510/18* (2013.01); *B60W 2710/0666* (2013.01); *B60W 2720/106* (2013.01)

(58) Field of Classification Search
    USPC .......... 701/22, 70; 180/65.1, 65.285, 65.28; 477/3, 92
    See application file for complete search history.

(56) References Cited

U.S. PATENT DOCUMENTS

| | | | |
|---|---|---|---|
| 2007/0228821 A1* | 10/2007 | Maki | B60K 6/445 303/151 |
| 2008/0093179 A1* | 4/2008 | Jager | B60L 7/22 188/72.2 |
| 2010/0089709 A1 | 4/2010 | Shimada et al. | |
| 2012/0073922 A1* | 3/2012 | Kaestner | B60L 7/18 188/70 R |
| 2012/0109441 A1* | 5/2012 | Vespasien | B60L 7/18 701/22 |

FOREIGN PATENT DOCUMENTS

| | | |
|---|---|---|
| DE | 10 2007 035612 | 3/2008 |
| DE | 10 2008 004201 | 7/2009 |
| DE | 10 2010 040726 | 3/2012 |

* cited by examiner

CONTROL DEVICE FOR A REGENERATIVE BRAKING SYSTEM OF A VEHICLE, AND METHOD FOR OPERATING A REGENERATIVE BRAKING SYSTEM OF A VEHICLE

FIELD OF THE INVENTION

The present invention relates to a control device for a regenerative braking system of a vehicle. The present invention also relates to a regenerative braking system for a vehicle. In addition, the present invention relates to a method for operating a regenerative braking system of a vehicle.

BACKGROUND INFORMATION

FIG. 1 shows a coordinate system for illustrating a conventional method for controlling a braking system. The conventional method for controlling the braking system is discussed, for example, in DE 10 2008 004 201 A1.

The x-axis of the coordinate system of FIG. 1 indicates a setpoint overall braking torque Mges-soll requested by a driver of a vehicle equipped with the relevant braking system. The requested setpoint overall braking torque Mges-soll may also be described as a driver braking intention and may be ascertained, for example, via an adjustment travel of a brake actuating element (pedal travel). An actual engine braking torque Mmot-ist which is exerted by a motor or generator is represented as the y-axis of the coordinate system of FIG. 1.

As long as the setpoint overall braking torque Mges-soll lies below a minimum braking torque M0 defined by a free travel of the braking system, the requested setpoint overall braking torque Mges-soll is exerted fully as the actual engine braking torque Mmot-ist on the respective wheels or axles of the vehicle with the aid of the motor or generator. Only after the free travel is ended when a setpoint overall braking torque Mges-soll equals the minimum braking torque M0 does the driver brake directly via a brake actuating element connected to a brake master cylinder of the braking system into the two brake circuits also connected to the brake master cylinder. In order for a sum of the actual engine braking torque Mmot-ist and an overall (not shown) actual friction braking torque of all wheel brake cylinders of the braking system to remain the same as the setpoint overall braking torque Mges-soll, the actual engine braking torque Mmot-ist must be reduced once a setpoint overall braking torque Mges-soll is equal to the minimum braking torque M0.

If the driver brakes into both brake circuits, the actual engine braking torque Mmot-ist is reduced to zero, which is represented in graph 2. In the conventional method represented herein, however, one of the two brake circuits may also be decoupled from the brake master cylinder by a closing of a shut-off valve. Once the shut-off valve is closed, the cancelled braking effect of the wheel brake cylinders of the decoupled brake circuit may be used to set the actual engine braking torque to unequal to zero, which is represented by graph 4.

SUMMARY OF THE INVENTION

The present invention provides a control device for a regenerative braking system of a vehicle having the features described herein, a regenerative braking system for a vehicle having the features of claim 8 and a method for operating a regenerative braking system of a vehicle having the features described herein.

With the aid of the present invention, a deceleration potential of the at least one electric motor may be better used. The present invention may also be described as an expansion of the limited regenerative deceleration potential by a non-compensated or blended regenerative deceleration component. With the aid of this additional non-compensated or blended deceleration component, it is possible to improve a regenerative efficiency of a braking system. As explained in greater detail below, this improvement is possible with no resulting changes to the deceleration behavior of the braking system being noticeable to the driver. Similarly, the driver senses no changes or virtually no changes when actuating a brake actuating element such as, for example, a brake pedal, but instead experiences a standard brake actuating sensation or pedal feel.

In the present invention, the non-compensated or blended regenerative deceleration component is additionally exerted with the aid of the at least one electric motor precisely when the setpoint overall braking torque requested by a driver and/or an automatic vehicle control system is above a limit braking torque. The non-compensated or blended regenerative deceleration component, i.e., the predefined additional braking torque, is therefore only relatively minimal in proportion to the setpoint overall braking torque. Thus, the change or increase of the regenerative deceleration potential according to the present invention has only a minimal effect on the vehicle deceleration. Moreover, the non-compensated or blended elimination of the additional braking torque is imperceptible or virtually imperceptible to the driver. This is due, in particular, to the fact that fluctuations in deceleration during a high requested setpoint overall braking torque or a high vehicle deceleration are significantly more difficult for a driver to perceive.

The additional exertion of the additional braking torque with the aid of the at least one electric motor of the vehicle may increase the recuperation efficiency of the motor. In particular, a more rapid chargeability of a vehicle battery may be ensured in this way. The present invention therefore assists in reducing fuel consumption and/or the pollutant emissions of the vehicle.

An electric drive motor of the vehicle may, for example, be used as the at least one electric motor. The feasibility of the present invention is not limited to electric vehicles or hybrid vehicles, however.

In one advantageous specific embodiment, the engine control device is also configured to define the at least one setpoint engine braking torque variable taking into additional consideration at least one provided or ascertained can-engine braking torque variable relative to the maximum can-engine braking torque impartable with the aid of the at least one electric motor. Thus, when controlling the at least one electric motor, a reduction of the maximum impartable can-engine braking torque, for example, due to a fully charged vehicle battery and/or a reduction of the vehicle speed below a minimum speed in generator mode, may also be taken into consideration. The setpoint engine braking torque may also be increased if the maximum impartable can-engine braking torque increases, for example, due to the instantaneous speed of the vehicle. The approaches described herein contribute to a more effective operation of the at least one electric motor used in generator mode, and to an increase in the recuperation efficiency of the regenerative braking system.

Moreover, the engine control device or another control device may be configured to define the at least one actual friction braking torque variable or at least one setpoint friction braking torque variable, taking into consideration at least the setpoint overall braking torque variable, and to control at least one component of the braking system with the aid of one additional control signal in such a way that the at least one actual friction braking torque may be imparted with the aid of the at least one additional friction brake according to the at least one actual friction braking torque variable or the at least one setpoint friction braking torque variable. This multifunctionality of the control device also allows the actual friction braking torque exerted with the aid of the at least one additional friction brake to be advantageously adapted to the requested setpoint overall braking torque and/or to the maximum impartable can-engine braking torque. This ensures an improved braking comfort. In addition, a savings on control electronics may also be achieved due to the multifunctionality of the control device.

For example, the engine control device or the additional control device may be configured to control at least one hydraulic component of a hydraulic braking system as the component of the braking system with the aid of the at least one additional control signal. The applicability of the control device described herein is, however, not reduced to the interaction with a hydraulic braking system. Instead, the control device may also interact with a braking system having a non-hydraulically configured friction brake.

In one advantageous specific embodiment, the engine control device or the additional control device is configured to control, with the aid of the at least one additional control signal, at least one shut-off valve, via which a brake circuit is connected to a brake master cylinder of the hydraulic braking system, at least one pump of the brake circuit, which is connected on the intake side to a brake fluid reservoir and on the discharge side to at least one wheel brake cylinder of the brake circuit as the at least one additional friction brake, and/or at least one continuously adjustable valve of the brake circuit, via which the at least one wheel brake cylinder is connected to the brake fluid reservoir, as the at least one hydraulic component. In this case, the control device may be used to operate a braking system, which includes a brake circuit, which may be decoupled from the brake master cylinder, or which may be decoupled at an axle. Thus, the decoupleable brake circuit may be used for blending at least one part of an actual engine braking torque exerted with the aid of the at least one electric motor, with no feedback effects occurring on the brake actuation element such as, for example, pedal feedback effects. Thus, the control device may be employed with a braking system, which is a cost-efficient alternative to a wheel brake actuator or brake-by-wire braking system, which is fully decoupled from a brake actuating element. At the same time, such a partially decoupleable braking system offers improved pedal comfort for the driver as opposed to a braking system in which the driver must carry out the deceleration regulating function himself.

In another advantageous specific embodiment, the engine control device is configured to define the at least one setpoint engine braking torque variable so that in the event of a vehicle speed-related reduction of the maximally impartable can-engine braking torque and/or a speed close to or above a minimum speed in generator mode, the setpoint engine braking torque may be reduced with a predefined negative reduction gradient amounting to at least $1.0 \text{ m/s}^3$, which may be amounting to at least $2.0 \text{ m/s}^3$, or even amounting to at least $2.5 \text{ m/s}^3$. The regenerative deceleration component achievable in this way having a relatively steep gradient enables a high recuperation efficiency until just before a vehicle comes to a stop. Thus, the effects of the reduction of the actual engine braking torque overlap with the stopping jerk, as a result of which the driver does not notice or barely notices the reduction of the actual engine braking torque.

In another advantageous specific embodiment, the engine control device is configured to define the at least one setpoint engine braking torque variable so that, given a constant setpoint overall braking torque variable or a constant setpoint overall braking torque, the setpoint engine braking torque may increase at most with a predefined limit increase gradient of not more than $0.3 \text{ m/s}^3$. The setpoint engine braking torque in this case (for example, when the position of the brake actuation device remains unchanged) may increase at most with a predefined limit increase gradient of not more than $0.2 \text{ m/s}^3$, or even not more than $0.1 \text{ m/s}^3$. The gradient limitation described causes a pleasant brake actuation feeling or pedal feel for the driver when the setpoint engine braking torque is increased. This may also be described as the gradient of the setpoint engine braking torque corresponding consistently to a maximum of a fixed value (for example, $0.1 \text{ m/s}^3$) and a change of the driver braking intention.

The advantages explained above are also ensured in a regenerative braking system for a vehicle having a corresponding control device.

Moreover, the advantages described above may be implemented by carrying out a corresponding method for operating a regenerative braking system of a vehicle. The method, too, may be further refined according to the specific embodiments described above.

Additional features and advantages of the present invention are explained below with reference to the figures.

DETAILED DESCRIPTION

Figure 2A:
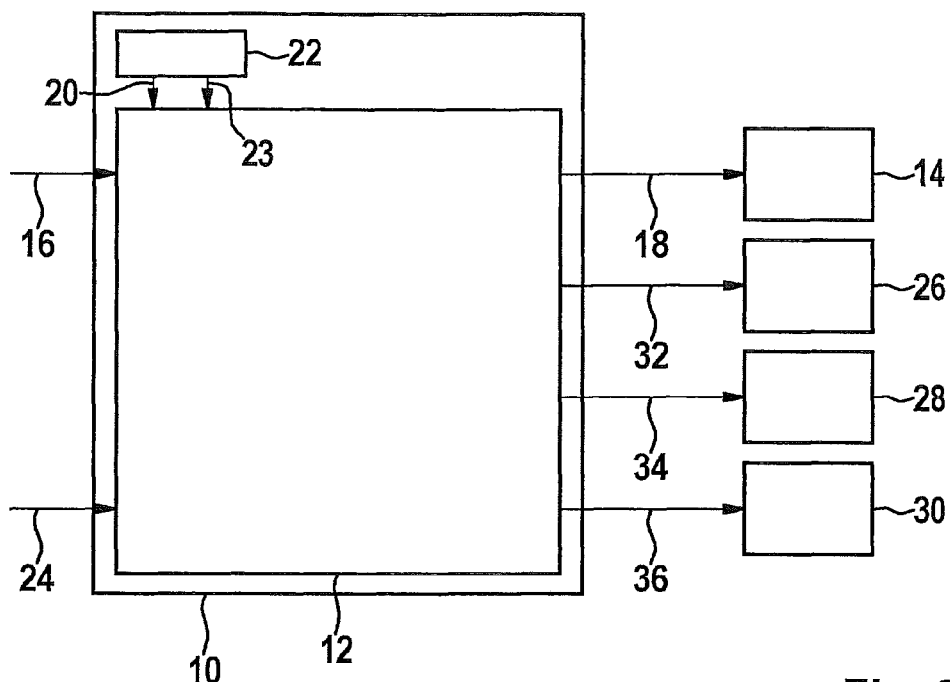
FIGS. 2a and 2b schematically show a representation of one specific embodiment of the control device and a coordinate system for illustrating the functionality thereof.
Figure 2B:
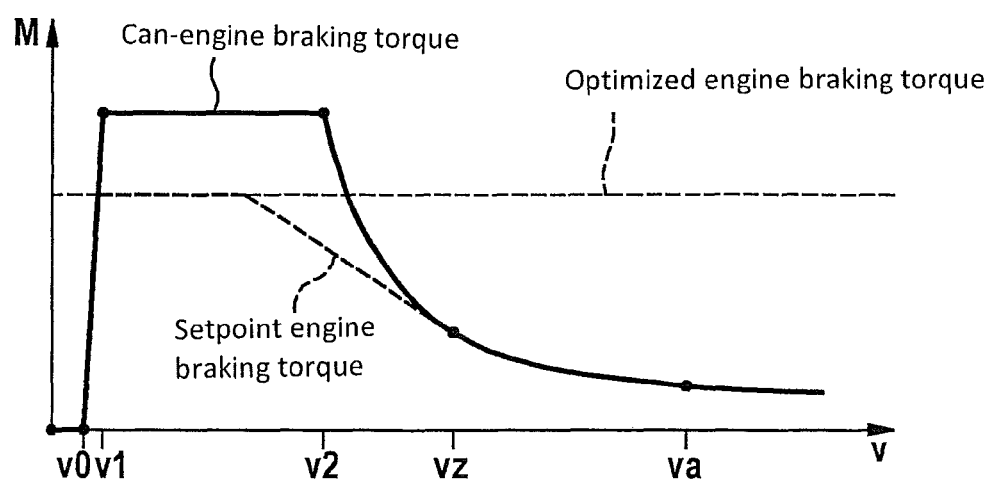

FIGS. 2a and 2b schematically show a representation of one specific embodiment of the control device and a coordinate system for illustrating the functionality thereof.

Control device 10 schematically depicted in FIG. 2a includes an engine control device 12, with the aid of which at least one setpoint engine braking torque variable with respect to at least one setpoint engine braking torque to be exerted of at least one electric motor 14 of the braking system usable in generator mode may be defined. Defining the setpoint engine braking torque variable may be carried out taking into consideration at least one setpoint overall braking torque variable 16 provided by at least one on-board sensor and/or by one on-board automatic vehicle control, with respect to a predefined setpoint overall braking torque. In addition, at least one (not depicted) actual friction braking torque variable with respect to at least one imparted or impartable (overall or individual) actual friction braking torque of at least one additional friction brake of the braking system may be taken into consideration when defining the at least one setpoint engine braking torque variable. At least one engine control signal 18 corresponding to the defined setpoint engine braking torque variable may be subsequently output to the at least one electric motor 14.

If setpoint overall braking torque variable 16 lies below a threshold value 20, engine control device 12 is configured to define the at least one setpoint engine braking torque variable according to a difference between the setpoint overall braking torque to be exerted and the at least one imparted or may be impartable actual friction braking torque. If, however, setpoint overall braking torque variable 16 lies above threshold value 20, engine control device 12 is then configured to define the at least one setpoint engine braking torque variable according to a sum of a predefined additional braking torque and the difference (between the setpoint overall braking torque to be exerted and the at least one imparted or impartable actual friction braking torque.).

Thus, during heavy braking, engine control device 12 enables an increase of the conventionally limited recuperative deceleration potential by the predefined additional braking torque as a non-compensated or blended regenerative deceleration component. Whereas in the case of a setpoint overall braking torque variable 16 below threshold value 20, the at least one electric motor 14 may be controlled in such a way that a sum of the at least one exerted actual engine braking torque of the at least one electric motor and the at least one (individual or overall) actual friction braking torque of the at least one additional friction brake of the braking system is equal to a braking torque, which corresponds to setpoint overall braking torque variable 16, the approach is different when a setpoint overall braking torque variable is above threshold value 20. In the case of a setpoint overall braking torque variable 16 above threshold value 20, the at least one electric motor 14 is controlled in such a way that a sum of the at least one actual engine braking torque of the at least one electric motor 14 and (a sum) of the at least one actual friction braking torque of the at least one additional friction brake is greater than the braking torque corresponding to setpoint overall braking torque variable 16 by the additional braking torque exerted with the aid of the at least one electric motor 14. As a result of the additionally exerted additional braking torque, a vehicle battery may be more rapidly charged with the aid of the at least one electric motor 14. Thus, the engine control device 12 may be used to reduce a fuel consumption and/or a pollutant emission of a vehicle equipped with control device 10.

Threshold value 20 advantageously corresponds to a braking torque of at least 0.15 g, in particular of 0.2 g, which may be of 0.3 g, or even 0.4 g. In the case of such a high setpoint overall braking torque, a heavier braking of the vehicle as a result of exceeding the setpoint overall braking torque with the aid of the additional braking torque is not perceived or barely perceived by the driver. Thus, the vehicle battery may be more rapidly charged with no loss of comfort to the driver.

Threshold value 20 may be provided, for example, by a memory unit 22 of control device 10. A value 23 corresponding to the additional braking torque may also be output by memory unit 22 to engine control device 12.

The at least one electric motor 14 may, for example, be a drive motor of the vehicle. The applicability of control device 10 is not limited, however, to an electric vehicle or hybrid vehicle. Instead of an electric drive motor, it is also possible to use another motor type for the at least one electric motor 14.

The at least one on-board sensor for providing setpoint overall braking torque variable 16 may, for example, be a brake travel sensor (brake request sensor, pedal travel sensor) such as, in particular, a rod displacement sensor, a brake pressure sensor and/or a braking force sensor. The designability of the at least one sensor is not limited, however, to the sensor types enumerated herein. Setpoint overall braking torque variable 16 may also be provided by a number of automatic vehicle controls such as, for example, an adaptive cruise control or an emergency braking system.

The at least one definable setpoint engine braking torque variable may, for example, be a value describing or defining the functionality of the at least one electric motor 14. In particular, the definable setpoint engine braking torque variable may be a setpoint speed of the engine.

The additional friction brake of the braking system is understood to mean a brake device, which may be used in addition to the at least one electric motor 14 for decelerating the vehicle with which it is equipped. Exemplary embodiments of the at least one additional friction brake will be described below.

Engine control device 12 is advantageously also configured to define the at least one setpoint engine braking torque variable with respect to one can-engine braking torque maximally impartable with the aid of the at least one electric motor 14, also taking into consideration at least one provided or ascertained can-engine braking torque variable 24. The at least one provided or ascertained can-engine braking torque variable 24 may, for example, include information regarding an instantaneous speed v of the vehicle and/or a charge state of the chargeable battery. Other exemplary embodiments for the at least one can-engine braking torque variable 24 are also possible. For example, the maximally impartable can-engine braking torque may itself also be provided as can-engine braking torque variable 24 to engine control device 12.

In the coordinate system of FIG. 2b, the instantaneous speed v of the vehicle is the x-axis. The y-axis corresponds to a braking torque M. The speed-dependent maximally impartable can-engine braking torque Mmot-kann is plotted as a graph in the coordinate system of FIG. 2b.

Based on the coordinate system of FIG. 2b, it is apparent that the at least one electric motor 14 is not regeneratively operable below a minimum speed v0 in generator mode, which is 1 km/h, for example. Above minimum speed v0 in generator mode, the maximally impartable can-engine braking torque Mmot-kann increases and reaches a maximum at a first speed v1. Above a higher, second speed v2, the maximally impartable can-engine braking torque Mmot-kann decreases quadratically.

When braking at or up to a speed v below the minimum speed v0 in generator mode, the actual engine braking torque is reduced completely. In the specific embodiment of FIGS. 2a and 2b, engine control device 12 is configured to define the setpoint engine braking torque Mmot-soll as the setpoint engine braking torque variable, so that at a vehicle speed-related reduction of the maximally impartable can-engine braking torque Mmot-kann and/or a speed v close to or above minimum speed v0 in generator mode, the setpoint engine braking torque Mmot-soll may be reduced at least with a predefined negative reduction gradient amounting to at least 1.0 m/s$^3$. The predefined negative reduction gradient may amount to at least 2.0 m/s$^3$, or even at least 2.5 m/s$^3$.

Thus, a high recuperation efficiency is possible until just before the vehicle comes to a stop. In particular in the case of a comparatively high setpoint overall breaking torque, for example, in the case of a setpoint overall braking torque or a setpoint overall braking torque variable above the limit braking torque or threshold value, the time between the reduction of the at least one actual engine braking torque and the coming to a stop is so short in this case, that the effects of the reduction or elimination of the at least one actual engine braking torque overlap with the stopping jerk. As a result, the reduction or elimination of the at least one actual engine braking torque is not perceived or barely perceived by the driver. Thus, the configuration of engine control device 12 described herein achieves an improved braking comfort for the driver when decelerating until his/her vehicle comes to a stop.

In the specific embodiment described herein, engine control device 12 may also define setpoint engine braking torque Mmot-soll so that a high actual engine braking torque may always be exerted on the associated wheels or axles with the aid of the at least one electric motor 14. For example, engine control device 12 may be configured to increase setpoint engine braking torque Mmot-soll in the event of a decreasing speed v of the vehicle above first speed v1, in particular, above second speed v2.

In the specific embodiment of FIGS. 2a and 2b, engine control device 12 is also configured to define setpoint engine braking torque Mmot-soll so that the setpoint engine braking torque may be increased, given a constant setpoint overall braking torque variable and/or a constant setpoint overall breaking torque at most with a predefined limit increase gradient of not more than 0.3 m/s$^3$, which may be of not more than 0.2 m/s$^3$, or even not more than 0.1 m/s$^3$. Engine control device 12 is thus configured to increase setpoint engine braking torque Mmot-soll solely with the allowable limit increase gradient, and no faster.

For example, while driving the vehicle with an initial speed va greater than second speed v2, a setpoint overall braking torque is requested, in which an optimized engine braking torque Mopt may be used, which is greater than the maximally exertable can-engine braking torque Mmot-kann at initial speed va. Thus, at initial speed va, a setpoint engine braking torque Mmot-soll is defined, which is the same as the maximally exertable can-engine braking torque Mmot-kann, but is significantly lower than optimized engine braking torque Mopt. With decreasing speed v, the maximally exertable can-engine braking torque Mmot-soll increases, so that setpoint engine braking torque Mmot-soll may be increased. Above an intermediate speed vz, however, the slope of the increase of the maximally exertable can-engine braking torque Mmot-kann is steeper than the predefined limit increase gradient. Thus, above intermediate speed vz at a further decreasing speed v, setpoint engine braking torque Mmot-soll is increased solely with the limit increase gradient until optimized engine braking torque Mopt is reached.

Since, in the case of the approach described herein, the increase of setpoint engine braking torque Mmot-soll is not quadratic, (corresponding to the increase of maximally exertable can-engine braking torque Mmot-kann), but is linear instead, a corresponding increase of an actual engine braking torque (equal to setpoint engine braking torque Mmot-soll) may be easily compensated for. Thus, despite the increase of setpoint engine braking torque Mmot-soll or actual engine braking torque, the driver has a pleasant brake actuating feel or pedal feel. In particular, the driver does not need to dynamically compensate for the rapid regenerative increase in deceleration with the aid of the brake actuation element or brake pedal. Nor does he sense any retroactive effects of the rapid regenerative increase in deceleration on the brake actuation element or brake pedal.

Engine control device 12 may be configured to directly increase or reduce setpoint engine braking torque Mmot-soll in the event of a change of the setpoint overall braking torque or of the brake pedal position, in order to prevent a temporal damping of the driver braking intention. The additional braking torque may also depend on the setpoint overall braking torque. A maximally allowable gradient of the additional braking torque may be applied as a compromise between energy efficiency and comfort.

Multiple values may be stored in memory unit 22 for the additional braking torque, the predefined negative reduction gradient and/or the predefined limit increase gradient. In this case, the driver has the option of selecting from a range of multiple operating modes of the control device, including at least one mode having maximum deceleration comfort and one additional mode having maximum energy efficiency, the operating mode, for example, by activating a corresponding button.

Moreover, engine control device 12 for control device 10 of FIGS. 2a and 2b is configured to define the at least one actual friction braking torque variable or at least one setpoint friction braking torque variable, taking into consideration at least setpoint overall braking torque variable 16 and/or provided or ascertained can-engine braking torque variable 24. Subsequently, at least one component 26 through 30 of the braking system may be controlled in such a way that at least one actual friction braking torque may be imparted with the aid of the at least one additional friction brake corresponding to the at least one actual friction braking torque variable, or the at least one setpoint friction braking torque variable. For this purpose, at least one additional control signal 32 through 36 may be output to the at least one component 26 through 30. (The functions described herein may also be implemented by an additional control arrangement of control device 10, instead of from engine control device 12).

In the specific embodiment described herein, at least one hydraulic component 26 through 30 of a hydraulic braking system may be controlled with the aid of the at least one additional control signal 32 through 36. In particular, at least one shut-off valve 26 may be controlled with the aid of at least one first control signal 32, via which a brake circuit is connected to a brake master cylinder of the hydraulic braking system. In addition, at least one pump 28 of the brake circuit, which is connected on the intake side to a brake fluid reservoir and on the discharge side to at least one wheel brake cylinder of the brake circuit (as the at least one additional friction brake), may be controlled with the aid of at least one second control signal 34. Furthermore, at least one continuously regulatable or controllable valve 30 of the brake circuit, via which the at least one wheel brake cylinder is connected to the brake fluid reservoir, may be controlled as an additional hydraulic component with the aid of at least one third control signal 36.

Thus, with the aid of control device 10, the advantages of a partially decoupled braking system may be utilized, the brake pressure in the brake circuit connected via the at least one shut-off valve 26 to the brake master cylinder in particular being adjustable, once the at least one shut-off valve 26 is closed, so that an actual friction braking torque is exerted. The hydraulic braking system may also be controllable with the aid of control device 10 in such a way that retroactive effects of an existing brake pressure on the brake actuation element such as, for example, recoils or vibrations of the brake pedal, are inhibited or prevented.

The combination of control device 10 and the corresponding hydraulic braking system thus allows for an improvement of the regenerative efficiency with no reduction in comfort. Since control device 10 is able to interact with the hydraulic braking system without changes to the hardware, the combination of control device 10 and the hydraulic braking system does not bring about an increase in manufacturing costs.

The advantages described above are also ensured in a braking system for a vehicle having control device 10.

Figure 3A:
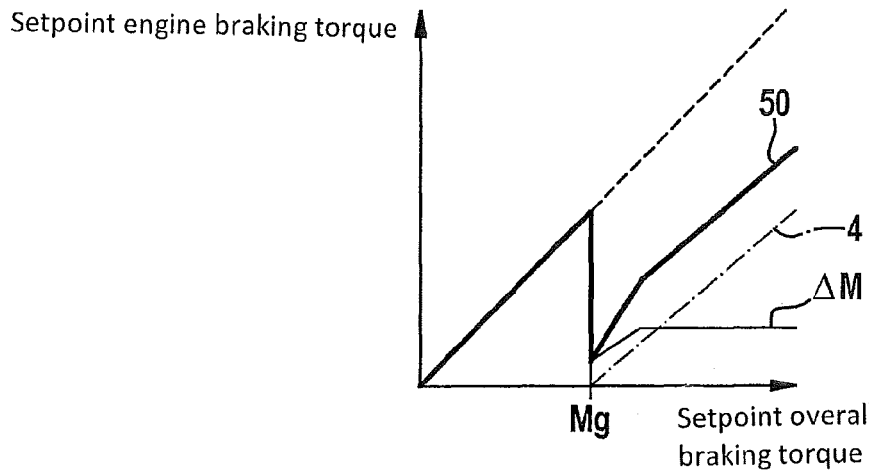
FIGS. 3a, 3b and 3c show coordinate systems for illustrating one specific embodiment of the method for operating a regenerative braking system of a vehicle.
Figure 3B:
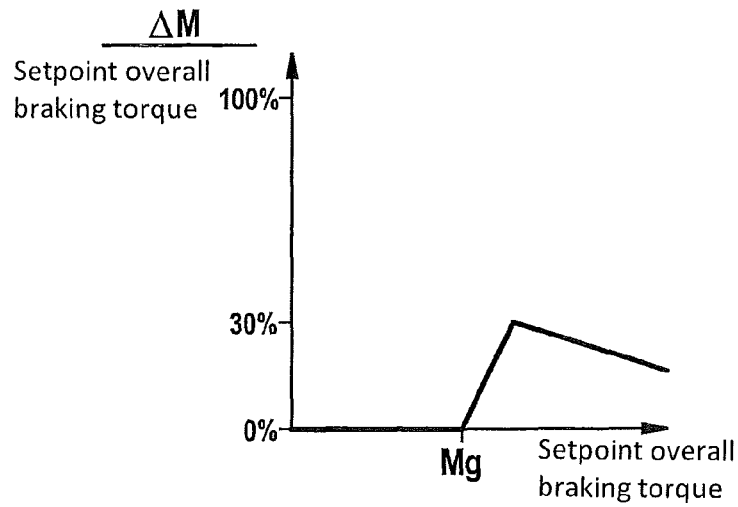
Figure 3C:
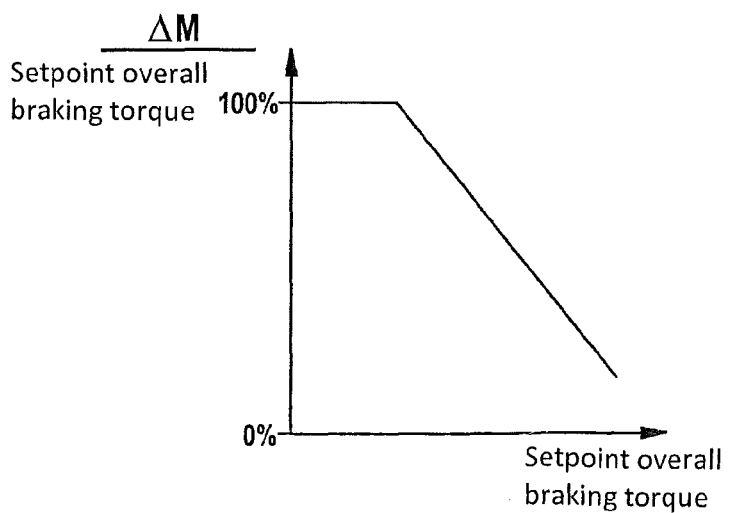

FIGS. 3a through 3c show coordinate systems for illustrating one specific embodiment of the method for operating a regenerative braking system of a vehicle.

The method described below may, for example, be carried out with the control device explained above. The feasibility of the method is not limited to the use of such a control device, however.

In the method, at least one setpoint engine braking torque Mmot-soll to be exerted of an electric motor of the braking system, which can be used in generator mode, is defined, taking into consideration at least one predefined setpoint overall braking torque Mges-soll, and at least one imparted or impartable actual friction braking torque of at least one additional friction brake of the braking system. The at least one electric motor is then controlled accordingly. The x-axis of the coordinate system of FIG. 3a is the setpoint overall braking torque Mges-soll. The y-axis of the coordinate system of FIG. 3a is the defined setpoint engine braking torque Mmot-soll.

If the setpoint overall braking torque Mges-soll is below a limit braking torque Mg, the at least one setpoint engine braking torque Mmot-soll to be exerted is defined in the method described herein according to a difference between the setpoint overall braking torque Mges-soll to be exerted and the at least one imparted or impartable actual friction braking torque. If the setpoint overall braking torque Mges-soll is above the limit braking torque Mg, the at least one setpoint engine braking torque Mmot-soll to be exerted is defined in the method described herein corresponding to a sum of a predefined additional braking torque ΔM and the difference (between the setpoint overall braking torque Mges-soll to be exerted and the at least one imparted or impartable actual friction braking torque).

Figure 1:
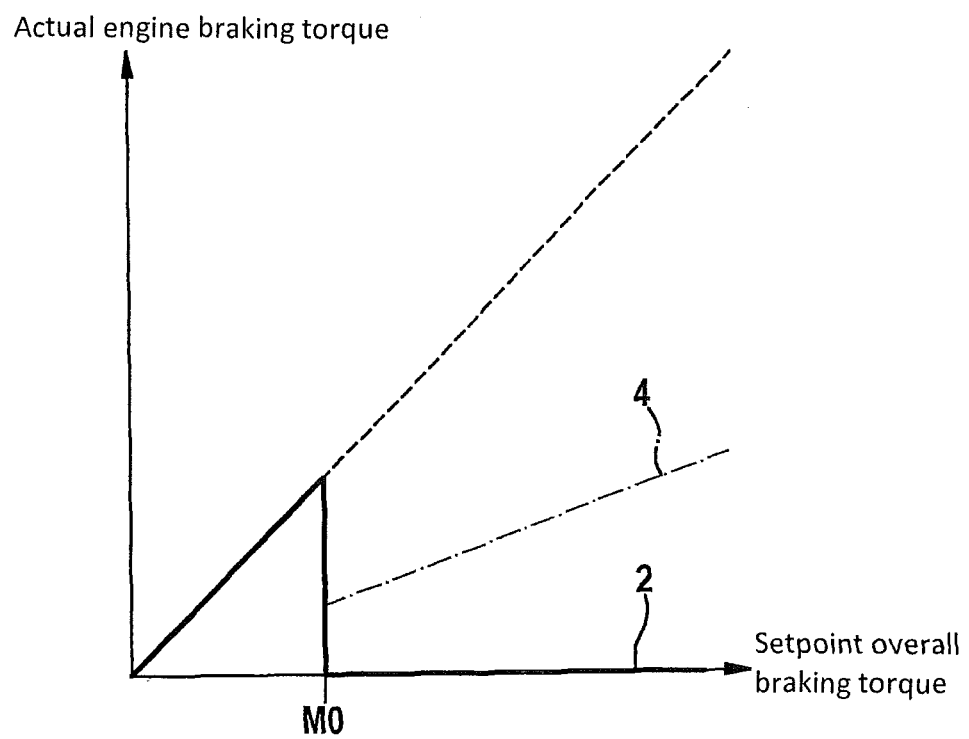
FIG. 1 shows a coordinate system for illustrating a conventional method for controlling a braking system.

For the purpose of comparison, graph 4 of FIG. 1 explained above is plotted in the coordinate system of FIG. 3a. Thus, the method described herein offers a significant increase in the recuperation efficiency above a setpoint overall braking torque Mges-soll equal to the limit braking torque Mg.

The x-axis of the coordinate systems of FIGS. 3b and 3c is also setpoint overall braking torque Mges-soll. The y-axes of the coordinate systems of FIGS. 3b and 3c represent quotients from the additional braking torque ΔM and the setpoint overall braking torque Mges-soll.

FIG. 3c corresponds to an approach in which a constant additional braking torque ΔM is exerted independently of setpoint overall braking torque Mges-soll in addition to setpoint overall braking torque Mges-soll. In contrast, represented in FIG. 3b is the method according to the present invention, in which above a setpoint overall braking torque Mges-soll equal to limit braking torque Mg, an additional braking torque ΔM is exerted, the value of which is also dependent on setpoint overall braking torque Mges-soll. Whereas in the approach of FIG. 3c, a relatively high deceleration component may not be blended, this disadvantage is eliminated with the aid of the method (of FIG. 3b) described herein.

In one refinement of the method, the at least one setpoint engine braking torque Mmot-soll to be exerted may be defined, also taking into consideration a can-engine braking torque maximally impartable by the at least one electric motor. In addition, the at least one actual friction braking torque or at least one setpoint friction braking torque may be defined, taking into consideration at least the setpoint overall braking torque Mges-soll to be exerted, at least one component of the braking system being controllable in such a way that the at least one defined actual friction braking torque or the at least one defined setpoint friction braking torque is imparted with the aid of the at least one additional friction brake of the braking system. At least one hydraulic component of a hydraulic braking system in this case may be controlled as the component of the braking system. For example, at least one shut-off valve, via which a brake circuit is connected to a brake master cylinder of the hydraulic braking system, at least one pump of the brake circuit, which is connected on the intake side to a brake fluid reservoir and on the discharge side to at least one wheel brake cylinder of the brake circuit (as the at least one additional friction brake), and/or at least one continuously adjustable valve of the brake circuit, via which the at least one first wheel brake cylinder is connected to the brake fluid reservoir, are controlled as the at least one hydraulic component.

Optionally, in the event of a vehicle speed-related reduction of the maximally impartable can-engine braking torque and/or at a speed close to or above a minimum speed in generator mode, the setpoint engine braking torque Mmot-soll may be reduced with at least one predefined negative reduction gradient amounting to at least 1.0 m/s$^3$. The setpoint engine braking torque Mmot-soll may also be increased, given a constant setpoint overall braking torque (for example, given a constant braking actuation travel or brake pedal travel) at most with a predefined limit increase gradient of not more than 0.3 m/s$^3$.

What is claimed is:

1. A control device for a regenerative braking system of a vehicle, the braking system including a friction brake and an electric motor that is usable in a generator mode, the control device comprising:
   an engine control device; and
   an interface;
   wherein the engine control device is configured to:
      receive, via the interface, a first variable that indicates a setpoint overall braking torque to be provided by the braking system and a second variable that indicates an amount of the setpoint overall braking torque that is to be applied by the friction brake as a friction braking torque;
      determine a setpoint engine braking torque to be applied by the electric motor in the generator mode based on the received first and second variables, wherein the determination is performed according to a condition that, (a) if the setpoint overall braking torque is below a threshold value, the setpoint engine braking torque is set to a first amount, which is an amount by which the setpoint overall braking torque as indicated by the received first variable exceeds the amount of the setpoint overall braking torque that is to be applied by the friction brake as indicated by the second variable, and (b) otherwise, the setpoint engine braking torque is set to a sum of the first amount plus a predefined additional braking torque; and
      output a control signal to control the electric motor to apply the determined setpoint braking torque.

2. The control device of claim 1, wherein the engine control device is configured to determine the setpoint engine braking torque, also taking into consideration a maximum can-engine braking torque that the electric motor can apply.

3. The control device of claim 2, wherein the engine control device is configured to define the control signal so that in the event of at least one of a vehicle speed-related reduction of the maximum can-engine braking torque that the electric motor can apply and a speed that is close to or above a minimum speed defined for the generator mode, the setpoint engine braking torque is reduced with a predefined negative reduction gradient amounting to at least 1.0 m/s$^3$.

4. The control device of claim 2, wherein the engine control device is configured to define the control signal so that, while the setpoint overall braking torque is constant, an increase of the engine braking torque is with a predefined limit increase gradient of at most 0.3 m/s$^3$.

5. The control device of claim 1, wherein the engine control device or an additional control device is configured to:
   determine the amount of the setpoint overall braking torque that is to be applied by the friction brake, taking into consideration at least the setpoint overall braking torque; and
   by at least one additional control signal, control at least one component of the braking system so that the friction brake is able to apply the friction braking torque.

6. The control device of claim 5, wherein the engine control device or the additional control device is configured to control by the at least one additional control signal at least one hydraulic component of a hydraulic braking system as the at least one component of the braking system.

7. The control device of claim 6, wherein the engine control device or the additional control device is configured to control by the at least one additional control signal at least one of:
   at least one shut-off valve via which a brake circuit is connected to a brake master cylinder of the hydraulic braking system;
   at least one pump of the brake circuit, which is connected on the intake side to a brake fluid reservoir and on the discharge side to at least one wheel brake cylinder of the brake circuit as the at least one additional friction brake; and
   at least one continuously adjustable valve of the brake circuit, via which the at least one wheel brake cylinder is connected to the brake fluid reservoir, as the at least one hydraulic component.

8. A regenerative braking system for a vehicle, comprising:
   a friction brake;
   an electric motor that is usable in a generator mode; and
   a control device that includes:
      an engine control device; and
      an interface;
   wherein the engine control device is configured to:
      receive, via the interface, a first varible that indicates a setpoint overall braking torque to be provided by the braking system and a second variable that indicates an amount of the setpoint overall braking torque that is to be applied by the friction brake as a friction braking torque;
      determine a setpoint engine braking torque to be applied by the electric motor in the generator mode based on the received first and second variables, wherein the determination is performed according to a condition that, (a) if the setpoint overall braking torque is below a threshold value, the setpoint engine braking torque is set to a first amount, which is an amount by which the setpoint overall braking torque as indicated by the received first variable exceeds the amount of the setpoint overall braking torque that is to be applied by the friction brake as indicated by the second variable, and (b) otherwise, the setpoint engine braking torque is set to a sum of the first amount plus a predefined additional braking torque; and
      output a control signal to control the electric motor to apply the determined setpoint braking torque.

9. A method for operating a regenerative braking system of a vehicle, the braking system including a friction brake and an electric motor that is usable in a generator mode, the method comprising:
   receiving, by an engine control device and via an interface, a first variable that indicates a setpoint overall braking torque to be provided by the braking system, the first variable being provided to the engine control device in response to a driver actuation of a braking apparatus;
   receiving, by an engine control device and via an interface, a second variable that indicates an amount of the setpoint overall braking torque that is to be applied by the friction brake as a friction braking torque;
   determining, by the engine control device, a setpoint engine braking torque to be applied by the electric motor in the generator mode based on the received first and second variables, wherein the determination is performed according to a condition that, (a) if the setpoint overall braking torque is below a threshold value, the setpoint engine braking torque is set to a first amount, which is an amount by which the setpoint overall braking torque as indicated by the received first variable exceeds the amount of the setpoint overall braking torque that is to be applied by the friction brake as indicated by the second variable, and (b) otherwise, the setpoint engine braking torque is set to a sum of the first amount plus a predefined additional braking torque; and
   outputting, by the engine control device and to the motor, a control signal to control the electric motor to apply the determined setpoint braking torque.

10. The method of claim 9, wherein the determination of the setpoint engine braking torque is performed also taking into consideration a maximum can-engine braking torque that the electric motor can apply.

11. The method of claim 10, wherein the control signal is defined so that, in the event of at least one of a vehicle speed-related reduction of the maximum can-engine braking torque that the electric motor can apply and a speed that is close to or above a minimum speed defined for the generator mode, the setpoint engine braking torque is reduced with a predefined negative reduction gradient amounting to at least 1.0 m/s$^3$.

12. The method of claim 10, wherein the control signal is defined so that, while the setpoint overall braking torque is constant, an increase of the engine braking torque is with a predefined limit increase gradient of at most 0.3 m/s$^3$.

13. The method of claim 9, wherein:
   the amount of the setpoint overall braking torque that is to be applied by the friction brake is determined taking into consideration at least the setpoint overall braking torque; and
   at least one component of the braking system is controlled so that the friction brake is able to apply the friction braking torque.

14. The method of claim 13, wherein at least one hydraulic component of a hydraulic braking system is controlled as the component of the braking system.

15. The method of claim 14, wherein the at least one hydraulic component is at least one of:
- at least one shut-off valve, via which a brake circuit is connected to a brake master cylinder of the hydraulic braking system;
- at least one pump of the brake circuit, which is connected on the intake side to a brake fluid reservoir and on the discharge side to at least one wheel brake cylinder of the brake circuit as the at least one additional friction brake; and
- at least one continuously adjustable valve of the brake circuit, via which the at least one wheel brake cylinder is connected to the brake fluid reservoir.

\* \* \* \* \*